Jan. 19, 1926.                                                1,570,524
F. H. PETERSEN
WEIGHT FOR THE HORNS OF CATTLE
Filed March 7, 1924

Inventor
Frank H. Petersen.
By H. S. Bailey, Attorney

Patented Jan. 19, 1926.

1,570,524

UNITED STATES PATENT OFFICE.

FRANK H. PETERSEN, OF DENVER, COLORADO, ASSIGNOR OF ONE-HALF TO CARL N. ROSE, OF DENVER, COLORADO.

WEIGHT FOR THE HORNS OF CATTLE.

Application filed March 7, 1924. Serial No. 697,639.

*To all whom it may concern:*

Be it known that I, FRANK H. PETERSEN, a citizen of the United States of America, residing at the city and county of Denver and State of Colorado, have invented new and useful Weights for the Horns of Cattle, of which the following is a specification.

My invention relates to a new type of horn weight, for use on the horns of cattle, especially young cattle; and it is adapted to cause the horns to turn downwardly and grow downwardly towards the face of the cattle as their horns grow.

And the objects of my invention are:—

First: To provide a weight that can be adjustably secured to any part of the length of the horns of cattle, especially young cattle, without forming a depression or a groove that would in the least disfigure or mar or rough up the symmetrical shape of its polished surface or injure it in any way to impede the free circulation of the blood in it that is necessary to its rapid growth.

Second: To provide a weight for the horns of cattle that clamps onto the horn with a long clamping bearing and with an even clamping pressure throughout its length, and that does not contain any projecting screw heads or other members that would be likely to loosen the weight on the horn when cattle are rubbing their horns against trees and posts.

I attain these objects by the mechanism illustrated in the accompanying drawings, in which.

Figure 1:
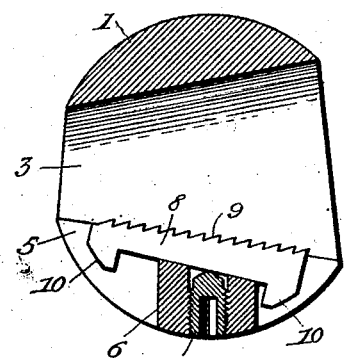
Figure 1 is a sectional view through the improved weight, taken longitudinally of the opening therethrough.

Similar letters of reference refer to similar views throughout the several views.

Referring to the drawings:

The numerals 1 and 2 designate a horn bending weight; and these horn bending weights can be made either round in the shape of a ball or oblong or in the shape of a pear; but I preferably make them either round or pear-shaped.

These weights are made in different sizes and weights from one pound to three pounds.

Each weight has a tapering hole 3 through its center from end to end which allows it to be placed large end first onto a tapering horn 4, and all cattle have tapering horns which taper from a point close to the head to a sharp point at their ends; and the object of the weights is to weight the horns down so they will move very slowly as they grow; and for this purpose the weight is positioned on the horn in different places in its length as the horn commences to turn; and also two different weights can be placed on a horn at different parts of its length, if desired, consequently the large end of the tapering aperture through these weights is placed on the horn and the weight is moved to the point where it is thought best to secure it.

My invention contemplates any means of securing a weight to a horn that does not disfigure or mar the surface of the horn, and in accomplishing this purpose I make a keyway 5 in the peripheral surface of the aperture 3 through the weight.

The keyway 5 is cut longitudinally through the wall of the tapered hole 3, and out through the periphery of the weight, but so as to leave a central bridge block 6, which is about a third the length of the keyway, and the top of this bridge block 6 is inclined in the direction of the keyway, as clearly shown in Figure 1, and it terminates a short distance below the point where the keyway 5 enters the hole 3.

The block 6 is provided with a central threaded hole in which is screwed a set screw 7 to hold a key 8, which secures the weight upon the horn. The key 8 is of the same width as the width of the keyway, and its upper edge is provided with teeth 9. The key tapers in thickness, as shown, and its under edge rests on the inclined upper face of the bridge block 6, and a depending lug or stop 10 is formed upon each end of the key. The key is placed in the keyway so as to rest upon the inclined face of the bridge block 6, and the weight placed upon the horn. The key is then driven forward, or toward the small end of the horn, and as the key is tapered, its toothed edge will be forced against the horn so as to tightly clamp the weight upon the horn.

The upper half of the horn receiving hole 3 in the weight is of an inverted V-shape in cross section, and this construction permits the horn, which is slightly curved, to be passed through the hole 3, as the outer curve of the horn will be accommodated by the V-shaped part of the hole, and thus permit the curved horn to fit in the straight-sided hole.

When the key 8 is inserted in the keyway 5, of the weight, the teeth pitch toward the large end of the tapered hole 3 in said weight, so as to permit the key the more easily to be driven forward to clamp the weight to the horn.

Figure 2:
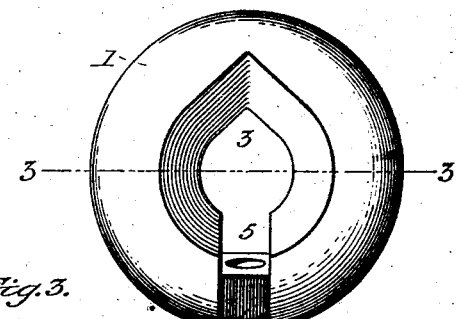
Figure 2 is a front view of Figure 1.
Figure 3:
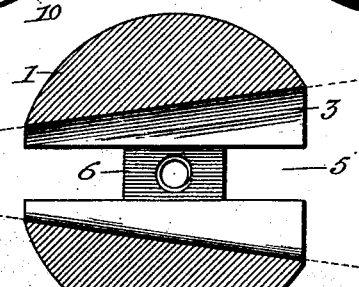
Figure 3 is a sectional view on the line 3—3 of Figure 2.
Figure 4:
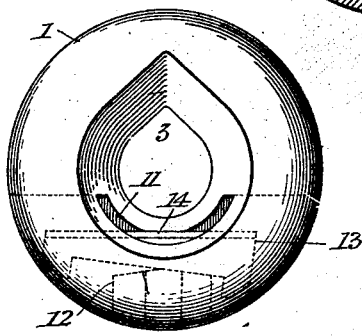
Figure 4 is a front view of a modified form of the weight.

In Figure 4 I show a weight having a tapered hole 3, the same as in Figures 1 to 3, but the keyway 11 extends through the weight at right angles to the hole 3 and so as to intersect the same. This keyway is placed at the opposite side of the weight from the V-shaped apex of the aperture through the weight. This arrangement of keyway and this form of aperture through the weights allows me to use keys of different thicknesses. Thus if I wish to apply a weight to a very small horn, I would place the apex portion of this aperture on the horn and then use a keyway thick enough to extend from this keyway up underneath the horn.

This keyway is formed with a central bridge block 12 similar to the bridge block 6, and its top may be inclined in a similar manner to the top of the block 6, or it may have a double incline, as shown in Figure 4. With this form of weight I employ a key 13 which tapers, like the key 8, but the teeth on its upper edge are dispensed with, and this edge of the key is formed with a V-shaped rib 14, which extends diagonally of the length of the key.

This key may be inserted in the keyway 11 from either end of the same, and when driven in, the rib 14 will be embedded in the horn sufficiently to hold the weight in place thereon, and as the rib is diagonal to the direction of the keyway, the forward driving of the key will cause the weight to be tightly clamped upon the horn. The key 13, is held against accidental displacement by a set screw 7, which is screwed into a threaded hole in the bridge block 12, and engages the under edge of the key.

The keys that I make are preferably provided with a projecting lug at their opposite ends so that they cannot be driven in any farther than the surface of the weights.

Figure 5:
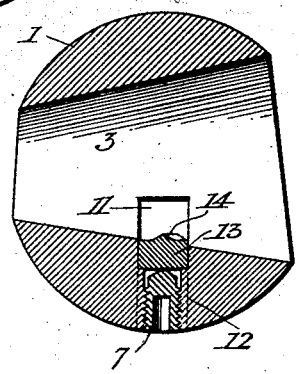
Figure 5 is a sectional view on the line 5—5 of Figure 4.
Figure 6:
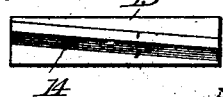
Figure 6 is a top view of the style of locking key shown in Figure 4.
Figure 7:
Figure 7 shows the application of the weights to the horns of a bullock.

After the weight has been placed on the horn in the position desired and the keys driven tightly into the keyway of the weight and against the horn, the set screw is turned to very tightly secure the keyway against accidental displacement from the horn. A hollow wrench receiving set screw is preferably employed, as shown in Figures 1 and 5.

My improved horn weight is simple in construction, inexpensive to manufacture, and easily and quickly applied to the horns of cattle, and will not disfigure them by making holes or grooves in them as some horn weights in use do.

Having described my invention, what I claim as new and desire to secure by Letters Patent, is:—

A horn weight of the character described, comprising a weight having a tapered horn-receiving hole, the outer half of which is V-shaped in cross section; a keyway extending through said weight at right angles to the horn-receiving hole, and interesecting said hole; a central bridge block connecting the sides of said keyway and having an inclined top; a tapered key adapted to rest upon said inclined top; an edged rib on the top of said key and diagonally disposed to the longitudinal axis of said key, which is adapted to impinge against the horn when the key is drawn forward and thereby wedge the weight upon the horn, said key having depending stops at its ends, and a screw which passes through said bridge block, and impinges against said key to prevent slipping of the same.

In testimony whereof I affix my signature.

FRANK H. PETERSEN.